United States Patent
MacMurray (10) Patent No.: US 7,395,805 B1
(45) Date of Patent: Jul. 8, 2008

(54) SINGLE CYCLE ELLIPTICAL ROTARY ENGINE

(76) Inventor: Seth MacMurray, P.O. Box 155, Tok, AK (US) 99780

( * ) Notice: Subject to any disclaimer, the term of this patent is extended or adjusted under 35 U.S.C. 154(b) by 5 days.

(21) Appl. No.: 11/263,634

(22) Filed: Oct. 31, 2005

(51) Int. Cl.
*F02B 53/00* (2006.01)

(52) U.S. Cl. .................................. 123/241; 123/243

(58) Field of Classification Search ................ 123/241, 123/243; 418/152
See application file for complete search history.

(56) References Cited

U.S. PATENT DOCUMENTS

| | | | |
|---|---|---|---|
| 719,222 A | 1/1903 | Huyck | |
| 1,014,162 A * | 1/1912 | McCormick | ................ 418/268 |
| 1,811,729 A | 6/1931 | Molkenbur | |
| 2,345,561 A | 4/1944 | Allen, Jr. | |
| 2,728,330 A | 12/1955 | Petersen | |
| 3,205,875 A * | 9/1965 | Praxmarer et al. | .......... 123/243 |
| 3,348,494 A | 10/1967 | Fischer | |
| 3,727,589 A | 4/1973 | Scott | |
| 3,938,478 A | 2/1976 | Piper | |
| 4,389,173 A | 6/1983 | Kite | |
| 5,937,820 A * | 8/1999 | Nagata et al. | ................ 123/243 |
| 5,947,712 A * | 9/1999 | Viegas et al. | ................ 418/152 |
| 6,539,913 B1 | 4/2003 | Gardiner | |
| 6,776,136 B1 | 8/2004 | Kazempour | |

FOREIGN PATENT DOCUMENTS

| | | |
|---|---|---|
| GB | 18.022 | 0/1913 |
| GB | 4914 | 1/2000 |

\* cited by examiner

*Primary Examiner*—Thomas Denion
*Assistant Examiner*—Mary A. Davis
(74) *Attorney, Agent, or Firm*—Michael I Kroll (57) ABSTRACT

A rotary engine having a rotor housing with a bisected, offset elliptical interior wall and a rotor member disposed therein. Four rotor vanes reciprocate radially from within said rotor wherein the opposing vanes perform the same function simultaneously as they pass through the cycle. The rotor vanes are forced out of the rotor by a pressurized oxygen/fuel mixture entering behind the vanes through the ports of the ported side plate. The rotation of the rotor urges the vanes back into the rotor due to the narrowing elliptical walls of the housing thereby forcing the oxygen/fuel mixture through the transfer ports and one-way check valve and into the combustion chamber where it is compressed and ignited.

14 Claims, 11 Drawing Sheets

INTAKE PHASE AT VANE "A"

FIG. 9

COMPRESSION PHASE AT VANE "A"

FIG. 10

IGNITION PHASE AT VANE "A"

FIG. 11

SINGLE CYCLE ELLIPTICAL ROTARY ENGINE

BACKGROUND OF THE INVENTION

1. Field of the Invention

The present invention relates generally to internal combustion engines and, more specifically, to a rotary engine having a rotor housing with a bisected, offset elliptical interior wall and a rotor member disposed therein. Four rotor vanes reciprocate within said rotor wherein the opposing vanes perform the same function simultaneously as they pass through the cycle. The rotor vanes are forced out of the rotor by a pressurized oxygen/fuel mixture entering behind the vanes through the ports of the ported side plate. The rotation of the rotor urges the vanes back into the rotor due to the narrowing elliptical walls of the housing thereby forcing the oxygen/fuel mixture through the transfer ports and one-way check valve and into the combustion chamber where it is compressed. Ignition timing plugs are supplied a constant high voltage current and ignite the compressed mixture as the rotor vanes pass the electrodes of the plugs. Exhaust gases escape as the rotor vanes pass the exhaust ports. In operation, both sets of opposing rotor vanes are performing identical operations simultaneously within one half of engine rotation, giving a more balanced performance.

2. Description of the Prior Art

There are other rotary engines designed to provide continuous power output. Typical of these is U.S. Pat. No. 719,222 issued to F. P. Huyck on Jan. 27, 1903.

Another patent was issued to H. F. Molkenbur on Apr. 22, 1926 as U.S. Pat. No. 1,811,729. Yet another U.S. Pat. No. 2,345,561 was issued to R. A. B. Allen Jr. on Apr. 4, 1944 and still yet another was issued on Dec. 27, 1955 to H. M. Petersen as U.S. Pat. No. 2,728,330.

Another patent was issued to W. M. Scott on Apr. 17, 1973 as U.S. Pat. No. 3,727,589. Yet another U.S. Pat. No. 3,938,478 was issued to J. N. Piper on Feb. 17, 1976 and still yet another was issued on Jun. 21, 1983 to W. C. Kite as U.S. Pat. No. 4,389,173.

Another patent was issued to W. P. Gardiner on Apr. 1, 2003 as U.S. Pat. No. 6,539,913. Yet another U.S. Pat. No. 6,776,136 was issued to S. M. Kazempour on Aug. 17, 2004. Still yet another patent application was published on Jan. 13, 1900 as International Publication Number 4914 to P. Blanc. International Publication Number 18,022 was issued on Aug. 5, 1913 to A. E. Escott.

U.S. Pat. No. 719,222

Inventor: Francis P. Huyck

Issued: Jan. 27, 1903

In a rotary engine, the combination of a revoluble member provided with radial guideways each terminating at its outer end in an enlarged transverse groove, a casing. Swinging piston members pivoted in said revoluble member and having pressure-sections arranged to travel in said guideways and project through said grooves, and shoes loosely connected to said pressure sections arranged to travel through said grooves and to lie flush with the revoluble member on the retraction of the swinging piston members.

U.S. Pat. No. 1,811,729

Inventor: Henry F. Molkenbur

Issued: Jun. 23, 1931

A rotary engine comprising a housing having elliptical shoulders, a rotor revolubly mounted about the shoulders, said rotor having radial slots, abutments slidable mounted in said slots and having their inner ends tiding over the elliptical shoulders for causing radial movement of the abutments, said housing having an elliptical inner wall engaged by the outer free ends of the sliding abutments, and lateral chambers being located in one of the flanges, and communicating with the combustion and compression chamber.

U.S. Pat. No. 2,345,561

Inventor: Roy A. B. Allen

Issued: Apr. 4, 1944

An internal combustion engine having a generally cylindrical rotor journaled within a casing, the surface of said casing being an varying distances from said rotor about it's periphery, blades sliding in various slot in said rotor, a trough and crest curled ribbon spring in the blade groove under the sealing elements resting on the several sealing elements resting on successive crests of the spring U.S. Pat. No. 2,728,330

Inventor: Hans M. Petersen

Issued: Dec. 27, 1955

In a rotary combustion engine, a housing having a coaxial cylindrical inner sides in two sections of different radii, the section of the smaller radius being relatively short with respect to the other section in direction circumferentially of the same and disposed between the ends of said other sections, said inlet and outlet being spaced apart in said other section a distance relative to the spacing of said vanes to permit said inlet to communicate with said outlet through said space for an interval during said rotation for scavenging said products from said space.

U.S. Pat. No. 3,348,494

Inventor: Arno Fischer

Issued: Oct. 24, 1967

A fluid displacement device in which the working chambers in succession form an annular space which is subdivided by partitions, while the cross sectional dimensions of the tubular vane members is greater than the respective dimension of the annular space, measured in a plane extending through the axis of the device, the peripheral wall carrying the partitions in the region in which they cooperate with said peripheral wall.

U.S. Pat. No. 3,727,589

Inventor: Wilbert Milo Scott

Issued: Apr. 17, 1973

A rotary internal combustion engine including a housing having a generally oval inner peripheral wall surface slidingly engaged by vanes radially slidably carried by a cylindrical rotor.

U.S. Pat. No. 3,938,478

Inventor: Jack N. Piper

Issued: Feb. 17, 1976

A concentric, valveless internal combustion engine is provided, consisting essentially of a rotary piston which revolves in a casing about a central shaft. The rotary piston contains combustion cavities distributed equidistantly around its perimetral wall surface. The casing contains combustion chambers and adjoining exhaust ports, and fuel intake manifolds in spaced relationship from one another. One or more means for igniting the fuel mixture is/are distributed at spaced intervals which are designed to provide timed ignitions of the fuel mixtures. Means are provided for starting the engine's rotation, and for feeding it a fuel-air mixture. As the piston rotates it carries the fuel mixture from the intakes to the points of fuel ignition, then to combustion chambers where the ignited fuel gases expand rapidly, and next to ports where the gases are exhausted from the engine. As the gases are formed the explosive force of their expansion against a certain portion of the engine housing and certain unique gate members causes the piston to rotate around the central shaft. The gate members are situated adjacent each combustion cavity. These gates are mounted for reciprocal movement radially into and out from the peripheral wall surface of the rotor. Sealing elements on the gates enable the gates to sweep the fuel-mixture to the combustion cavities, the gases being compressed en route with the help of shaped manifolds in the housing wall, and to sweep the burnt gases out of the combustion cavities and expansion chamber into and out through the exhaust ports.

U.S. Pat. No. 4,389,173

Inventor: William C. Kite

Issued: Jun. 21, 1983

A rotary engine is provided utilizing a non-cylindrical casing which defines lobes on opposite sides which define crescent-shaped intake and combustion chambers, respectively, these chambers being connected by a narrow corridor on both sides of a central rotor which rotates on an axis coaxial with that of the casing. The rotor includes arcuate blades which move in and out of the rotor wall to wipe the non-cylindrical casing wall, these blades or pistons being urged outwardly by a special spring loaded cam follower which follows a dual cam which is non-rotational relative to the engine casing. In the preferred mode of operation, one of the crescent-shaped chambers acts as the intake and compression chamber, with the second chamber acting as the combustion and exhaust chamber by virtue of the positioning of intake and exhaust ports and a specialized automatically operated pressure driven fuel injector which is used when the engine is operated as a diesel.

U.S. Pat. No. 6,539,913

Inventor: William B. Gardiner

Issued: Apr. 1, 2003

The present invention provides an internal combustion engine and a method of manufacturing the internal combustion engine. The internal combustion engine comprises a housing, a first rotor, first and second impellers and a compression cam. In a preferred embodiment, the housing has a first inner surface defining a first cavity therein, the first rotor is journalled for rotation within the first cavity and is situated to define compression and exhaust cavities on opposing sides therein, first and second impellers located in, and slidable with respect to, first and second opposing radial apertures in the first rotor, and the compression cam is fixedly coupled to the housing. The compression cam has a working surface portion that corresponds to a profile of the inner surface to force the first and second impellers to contact the inner surface and a dead surface portion that departs from the profile to allow the first and second impellers to withdraw from the inner surface.

U.S. Pat. No. 6,776,136

Inventor: Shahroukh M. Kazempour

Issued: Aug. 17, 2004

An elliptical rotary engine having a cylindrical rotor that rotates within a cyclindrical housing having cycling chambers defined between a plurality of radially extending piston vanes disposed within vane channels within the rotor. During the rotation of the rotor, the piston vanes are urged radially outward by cam-like elliptical piston vane guides associated with the head and the base of the housing and are returned therein by the elliptical interior wall as the diameter thereof decreases.

While these combustion engines may be suitable for the purposes for which they were designed, they would not be as suitable for the purposes of the present invention, as hereinafter described.

SUMMARY OF THE PRESENT INVENTION

A primary object of the present invention is to provide an elliptical rotary engine having two pair of opposing, reciprocating vanes wherein each vane in a pair simultaneously passes through each phase of the cycle.

Another object of the present invention is to provide an elliptical rotary engine that will provide more balanced performance than other rotary engines due to the dual-firing opposing rotor vanes.

Yet another object of the present invention is to provide an elliptical rotary engine having a housing with an end plate and a ported end plate.

Another object of the present invention is to provide an elliptical rotary engine having a cylindrical rotor with vane guides in which said vanes are disposed and transfer ports affiliated with each said vane guide.

Yet another object of the present invention is to provide an elliptical rotary engine that is simple and easy to use.

Still yet another object of the present invention is to provide an elliptical rotary engine that is inexpensive to manufacture and operate.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Single Cycle Elliptical Rotary Engine of the present invention. With regard to the reference numerals used, the following numbering is used throughout the various drawing figures.

10 Single Cycle Elliptical Rotary Engine of the present invention
11 housing assembly
12 rotor housing
14 elliptical interior wall of 12
16 endplate
18 ported end plate
20 ignition timing port
22 exhaust port
24 bolt
25 rotor assembly
26 rotor
28 vane guide of 26
30 vane
32 power shaft
34 power shaft throughbore of 18
36 transfer port
38 marks of degree of 20
40 fuel/oxygen intake port
42 groove
44 bearing bore
46 seal element
48 bolt holes
50 bearing boss
52 check valve
54 ignition timing port
56 ignition wire plug
58 electrode
60 seal groove
62 timing indicator mark
64 valve "A"
66 valve "B"
68 valve "C"
70 valve "D"
72 transfer port "A"
73 point of egress of 72
74 fuel/oxygen mix
76 intake port 1
77 intake port 2
78 first combustion chamber
80 second combustion chamber
82 vane notches
84 pressure chamber

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
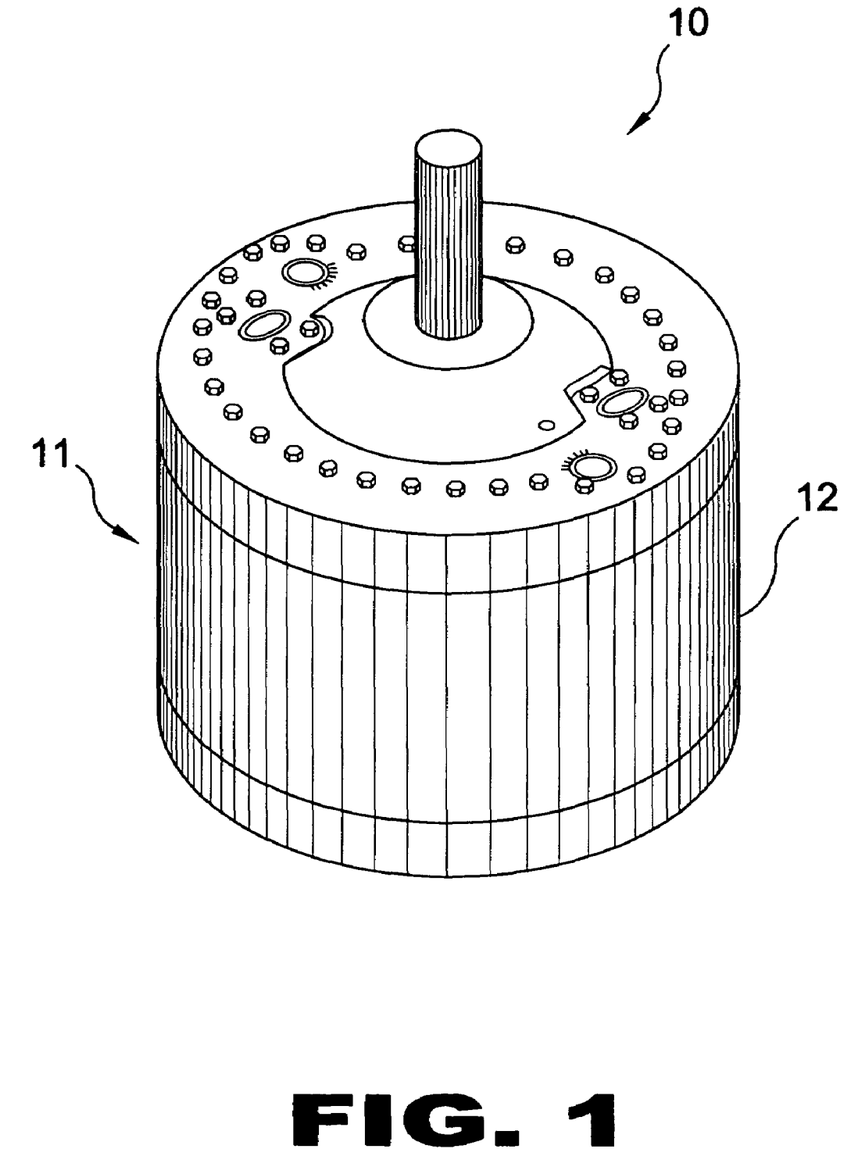
FIG. 1 is a perspective view of the present invention.

FIG. 1 is a perspective view of the present invention 10. The present invention 10 is a single cycle rotary engine having a housing assembly 11 with rotor housing 12 having an elliptical interior. The objective of the present invention 10 is to provide a more balanced performance than other similar engines.

Figure 2:
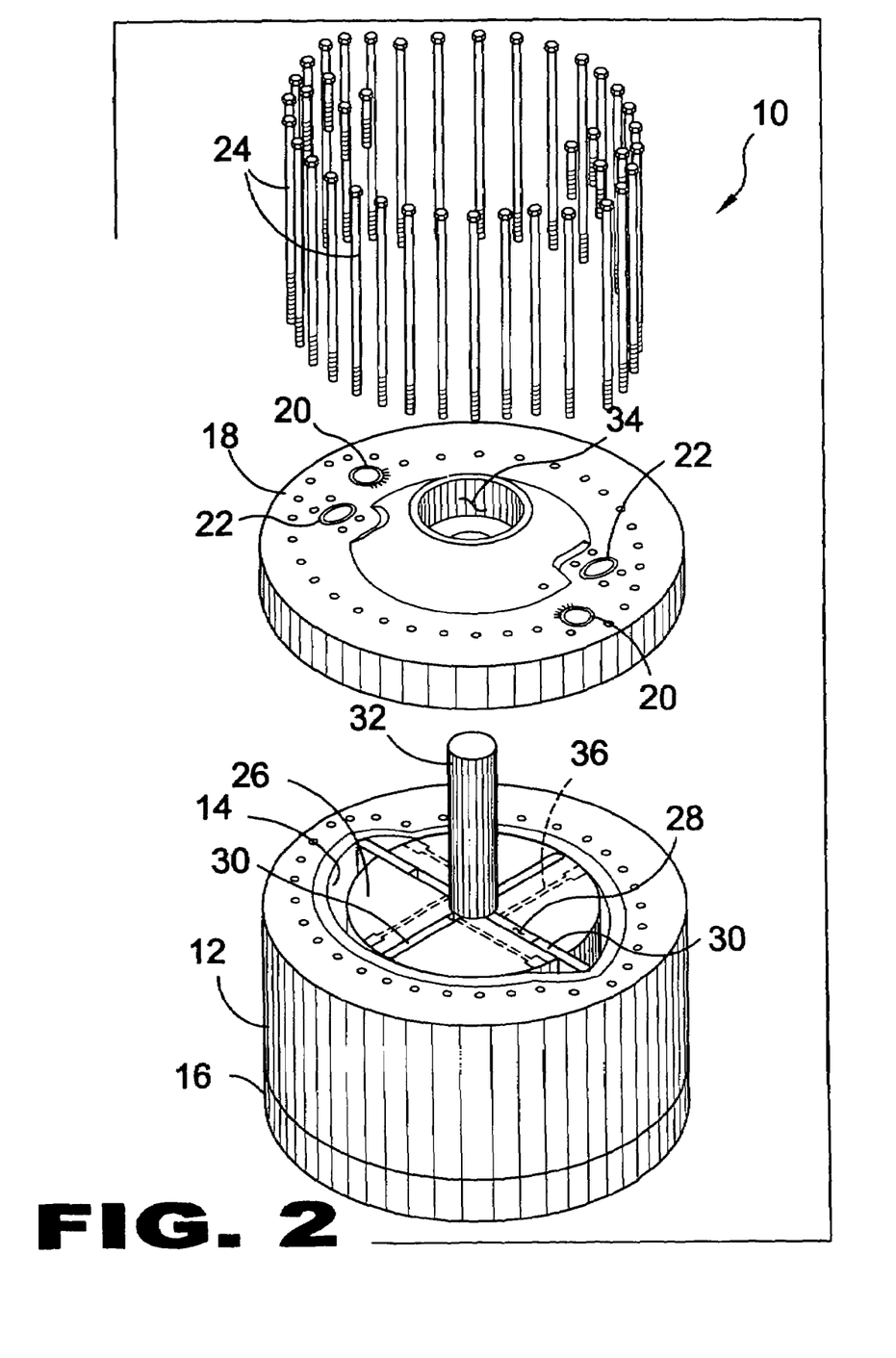
FIG. 2 is an exploded perspective view of the present invention.

FIG. 2 is an exploded perspective view of the present invention 10. Bolts 24 secure the end plate 16 and the ported end plate 18 to the rotor housing 12. The rotor housing 12 has a bisected, offset elliptical interior wall 14 in which the rotor 26 travels in an axial rotation. A plurality of vanes 30 reciprocate radially from within their respective vane guides 28 disposed within the rotor 26. Transfer ports 36 communicate between the vane guides 28 and the exterior sidewall of the rotor 26. A power shaft 32 extends from the rotor 26 through a power shaft throughbore 34 centrally disposed on the ported end plate 18. The ported end plate 18 further includes a pair of ignition timing ports 20 and a pair of exhaust ports 22.

Figure 3:
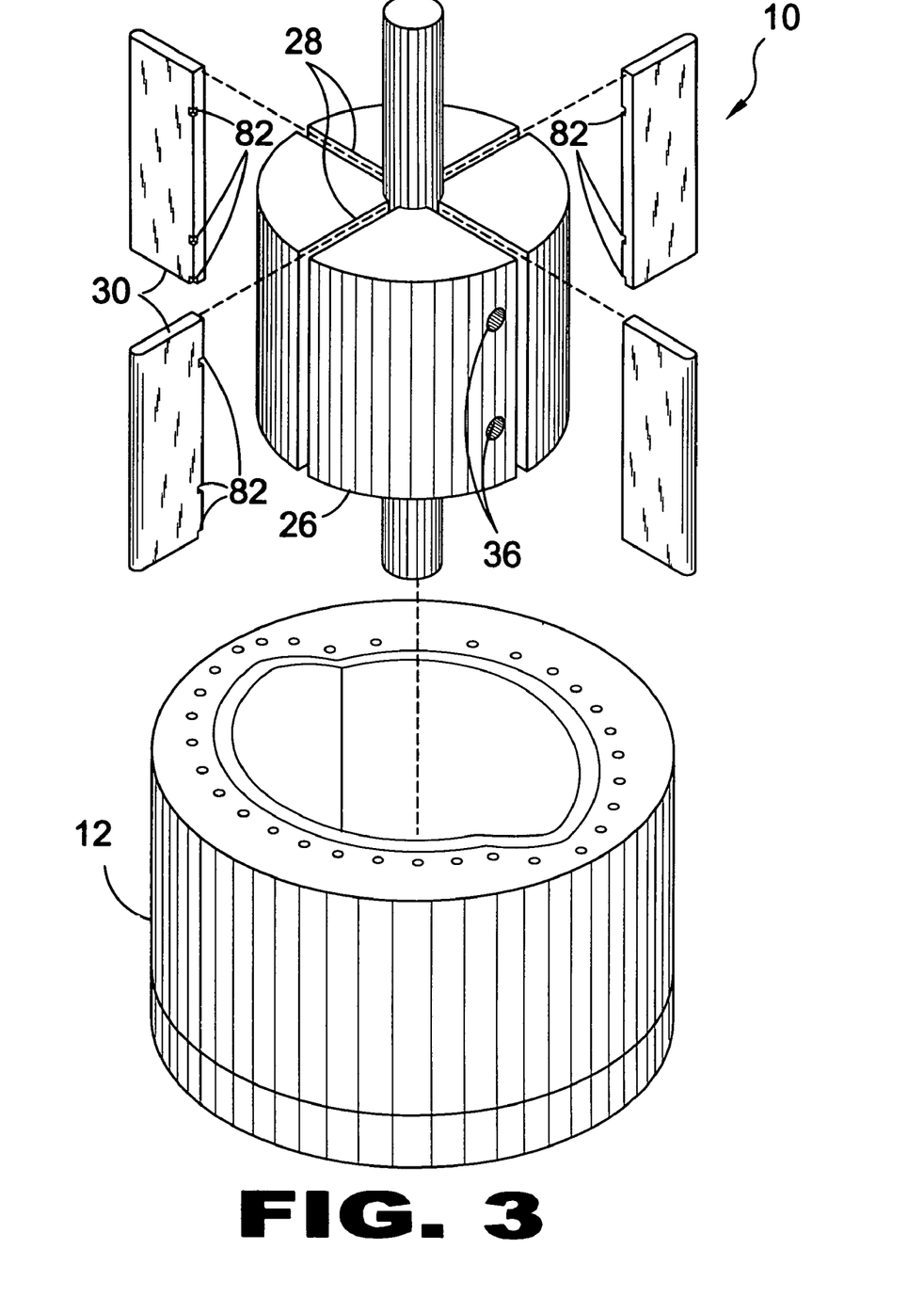
FIG. 3 is an exploded perspective view of the rotor and housing of the present invention.

FIG. 3 is an exploded perspective view of the rotor 26 and housing 12 of the present invention 10. Shown are the vanes 30 having a plurality of notches 82 on an edge thereof and their relationship with the vane guides 28 in the rotor 26. Also shown are the transfer ports 36 in the sidewall of the rotor 26.

Figure 4:
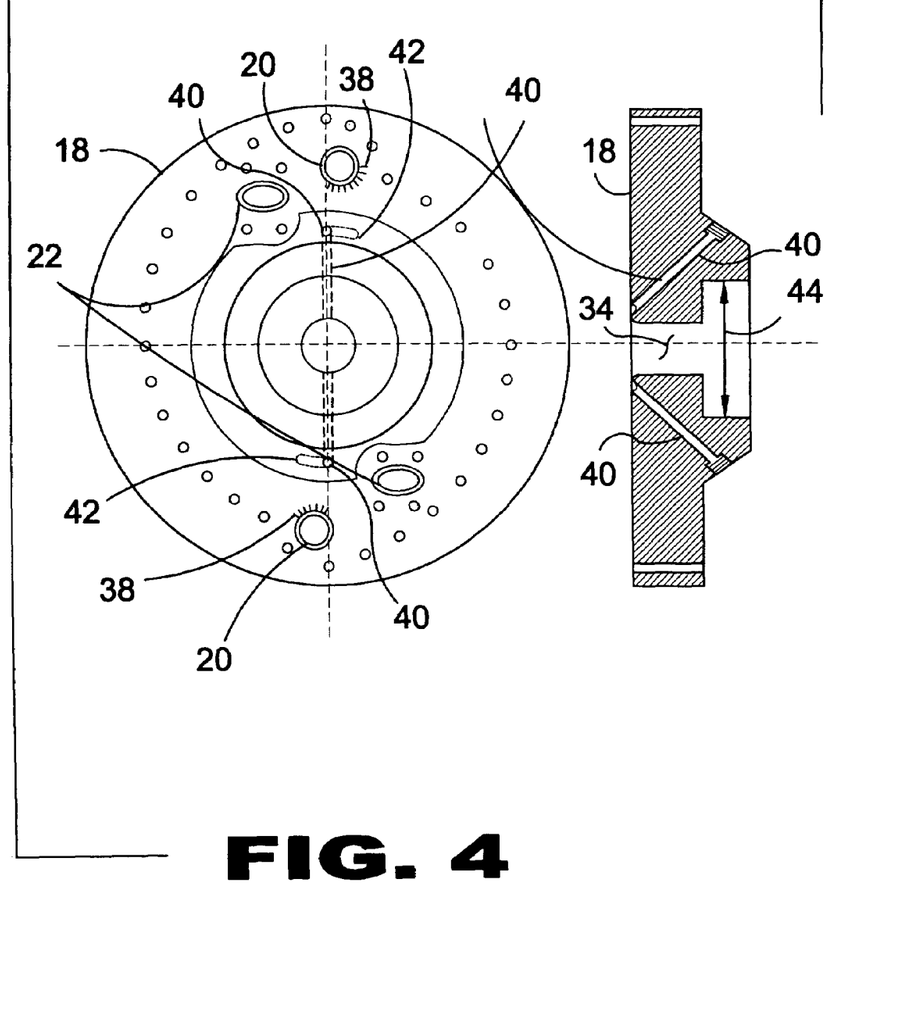
FIG. 4 is a top and sectional view of the ported end plate of the present invention.

FIG. 4 is a top and sectional view of the ported end plate 18 of the present invention. Shown are the ignition timing ports 20 with marks of degree 38 to aid in timing adjustment, exhaust ports 22 and the fuel/oxygen intake ports 40 and associated grooves 42. The power shaft throughbore 34 terminates with a bearing bore 44 having a greater circumference.

Figure 5:
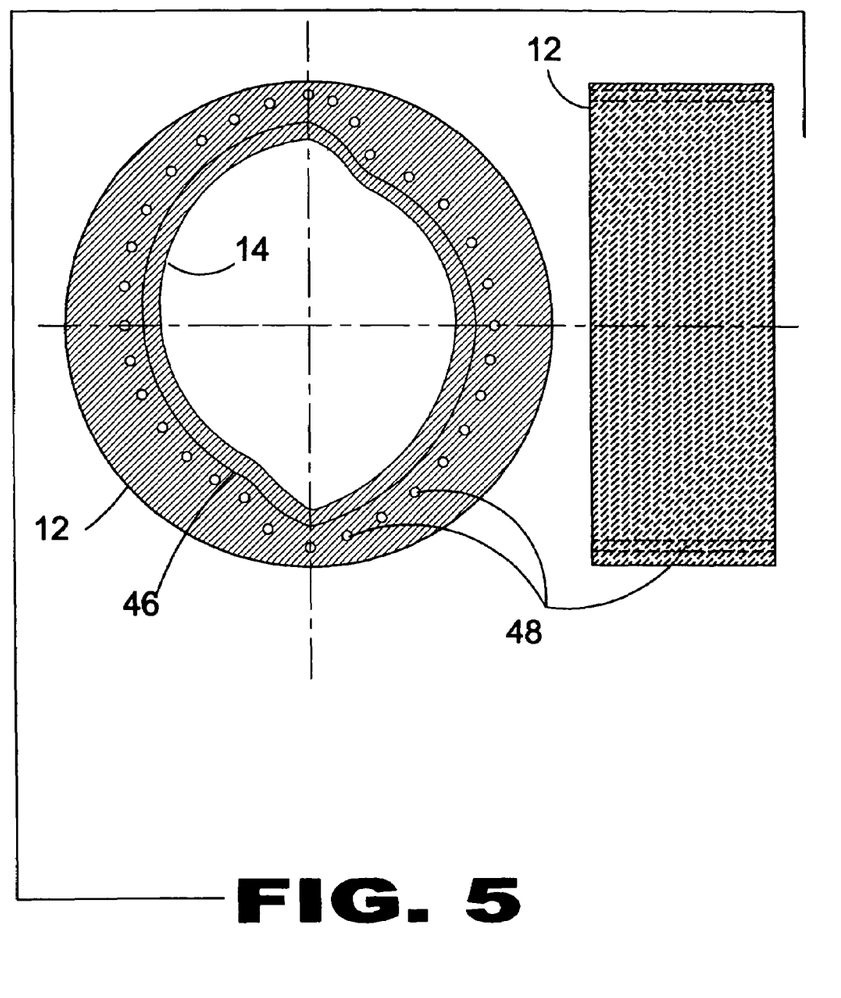
FIG. 5 is a sectional top and side view of the housing of the present invention.

FIG. 5 is a sectional top and side view of the housing 12 of the present invention. Shown is the rotor housing 12 having a bisected, offset elliptical interior wall 14, a plurality of bolt holes 48 and a seal element 46.

Figure 6:
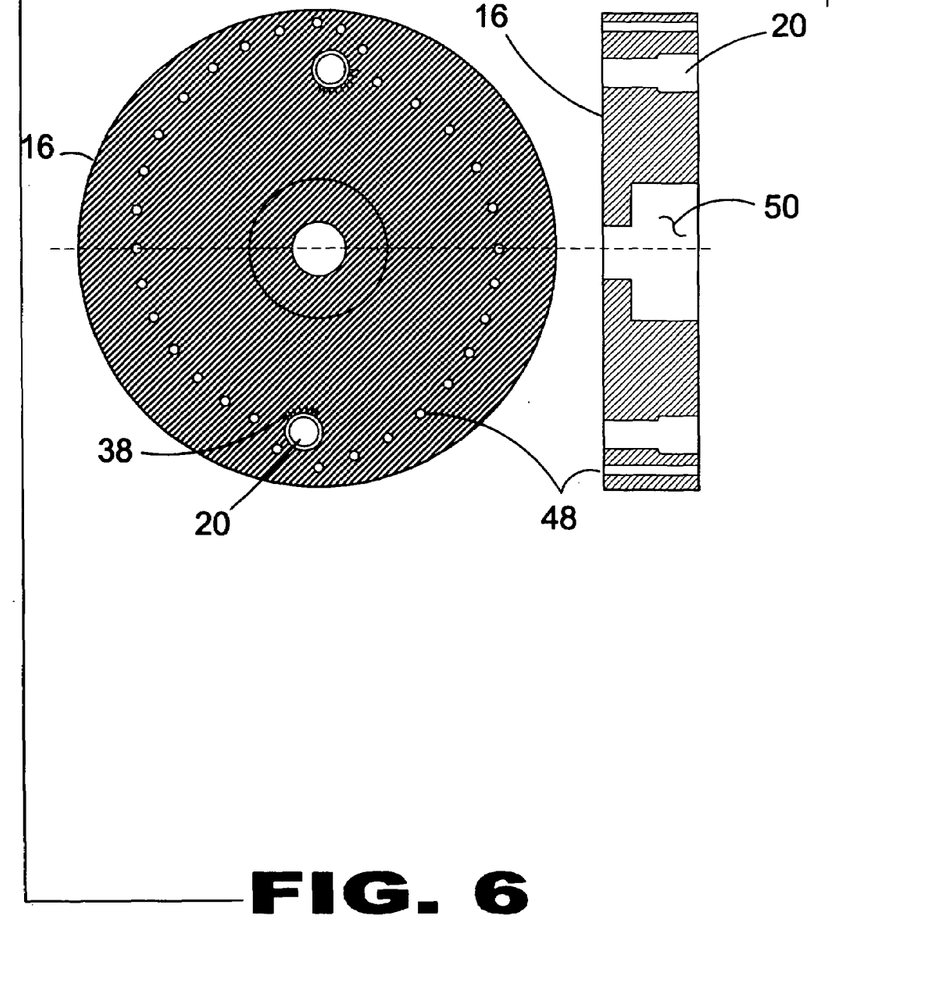
FIG. 6 is a top and sectional top view of the end plate of the present invention.

FIG. 6 is a top and sectional top view of the end plate 16 of the present invention. Shown is the end plate 16 with bolt holes 48, bearing boss 50, ignition timing ports 20 and their marks of degree 38.

Figure 7:
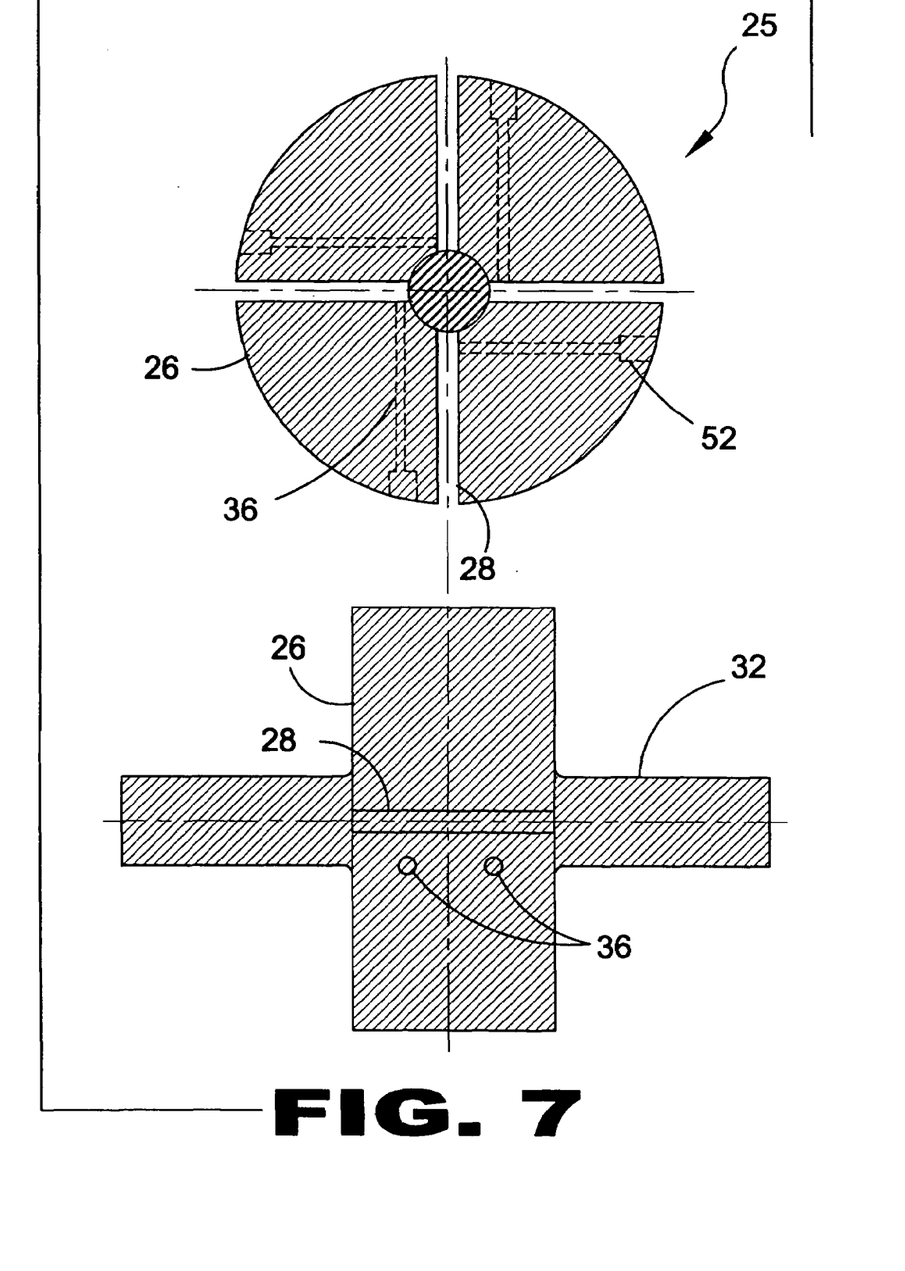
FIG. 7 is a sectional side and top view of the rotor assembly.

FIG. 7 is a sectional side and top view of the rotor assembly 25. Shown is the rotor assembly 25 and its rotor 26, power shaft 32, vane guides 28, transfer ports 36 and their related check valves 52.

Figure 8:
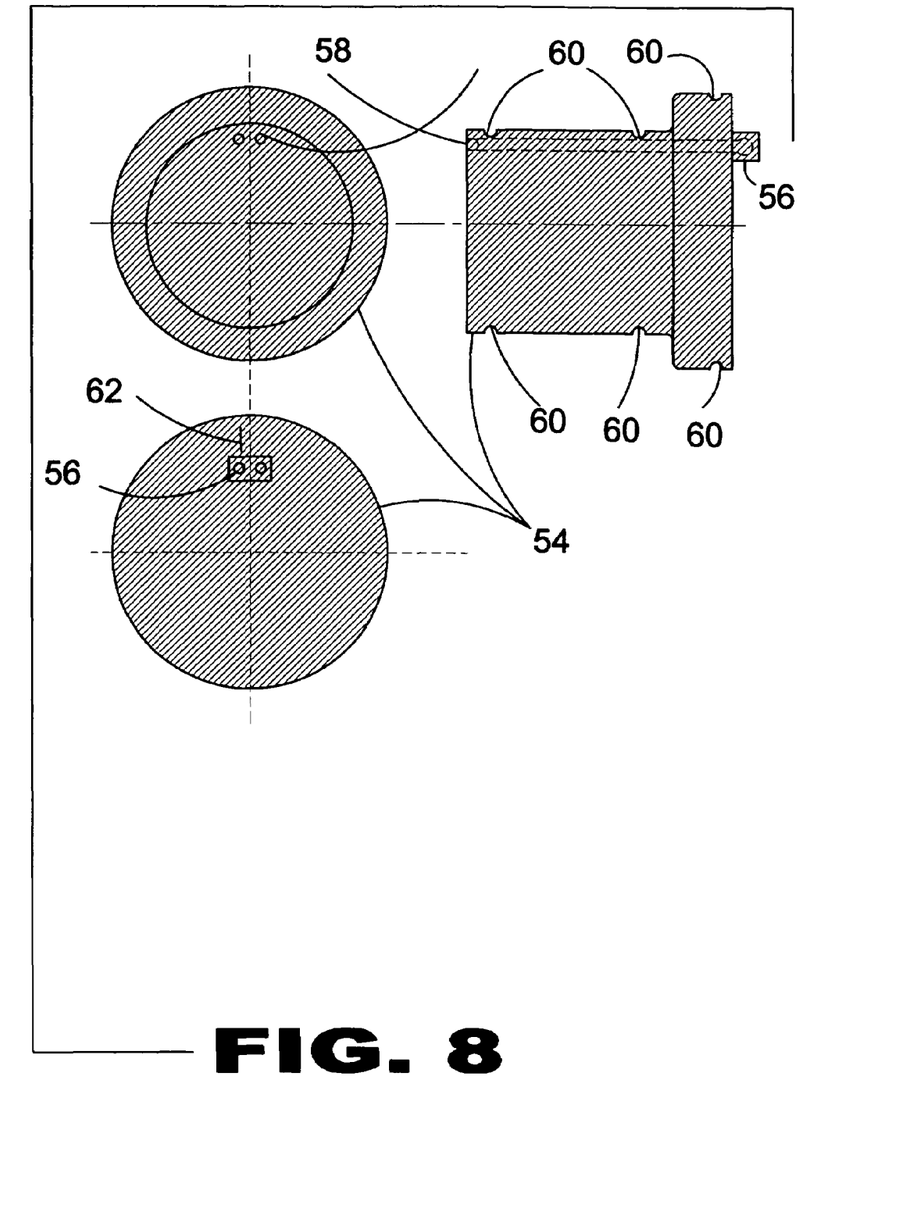
FIG. 8 is the ignition timing plug of the present invention.

FIG. 8 is a top and side sectional view of the ignition timing plug 54 of the present invention. Shown is the ignition timing plug 54 with ignition wire plug 56, timing indicator mark 62, electrodes 58 and seal grooves 60.

Figure 9:
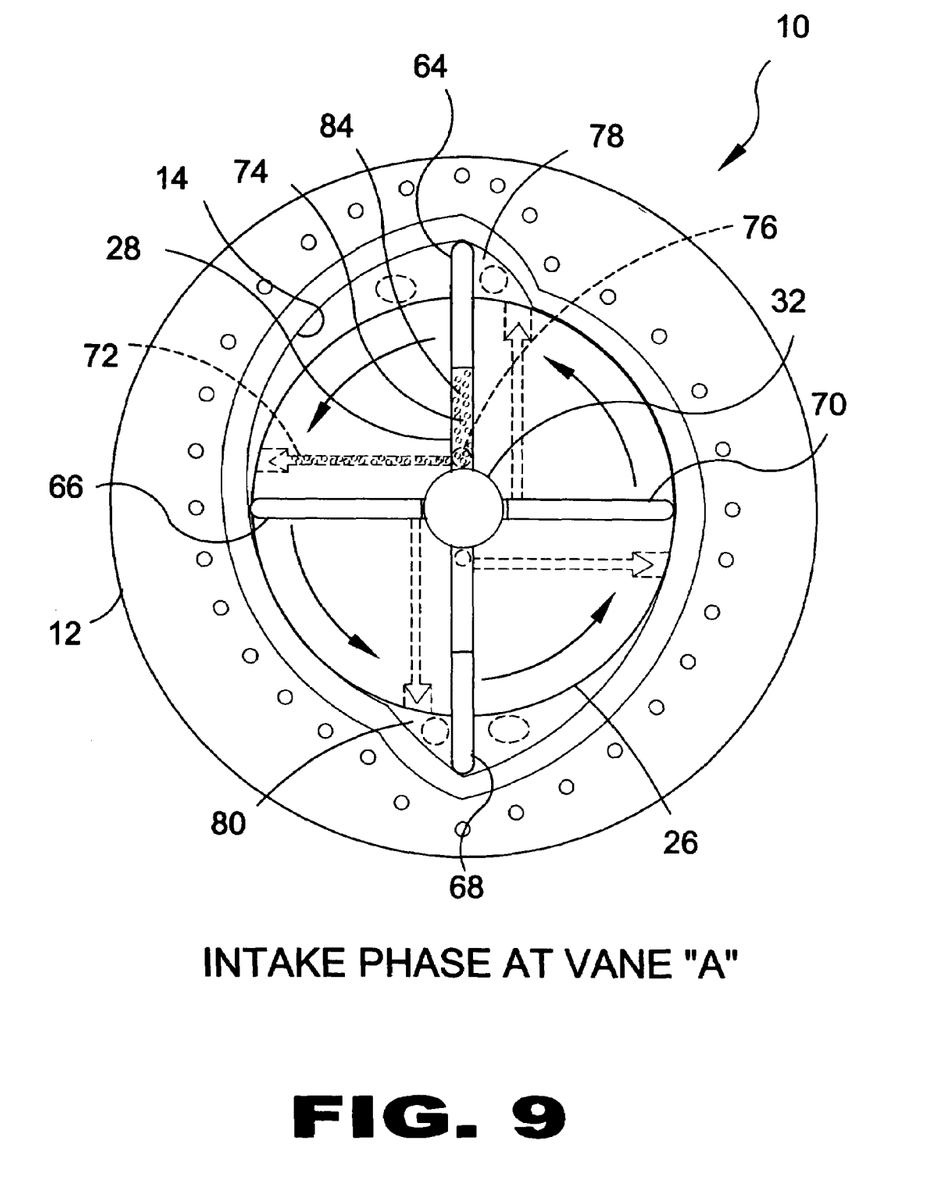
FIG. 9 is the intake phase at vane "A"

FIG. 9 is the intake phase at vane "A" 64. The single cycle rotary engine of the present invention 10 has four radially extending vanes comprising two pairs of opposing vanes (vanes "A" 64 and "C" 68, vanes "B" 66 and "D" 70) reciprocatively disposed within the rotor 26 wherein each opposing pair of vanes simultaneously performs the same task throughout the cycle. For purposes of clarity the illustrations will describe the operation of vane "A" 64 and its influence and dependency upon the adjacent vanes "B" 66 and "D" 70. The interior wall 14 of the rotor housing 12 is a bisected offset ellipse forming a pair of opposing irregular curves defining a first combustion chamber 78 and a second combustion chamber 80. Shown is the fuel/oxygen mix 74 entering intake port 1 76 and pressurizing transfer port "A" 72 and the pressure chamber 84 in the vane guide 28 between the back of vane "A" 64 and the power shaft 32 thus urging vane "A" 64 to extend against the elliptical wall 14 in the first combustion chamber 78.

Figure 10:
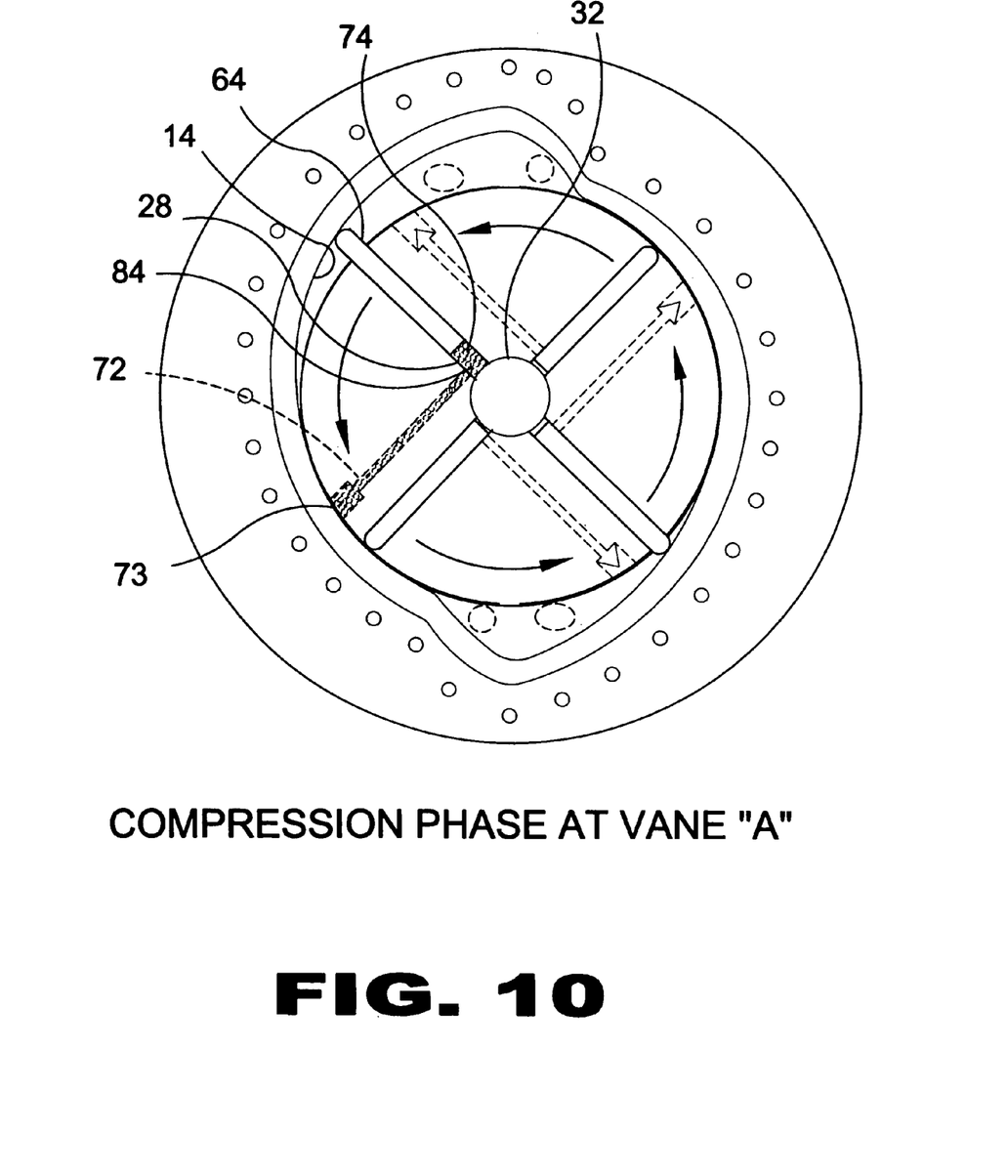
FIG. 10 is the compression phase at vane "A"

FIG. 10 is the compression phase at vane "A" 64. Shown is the fuel/oxygen mix 74 being compressed to a volatile state by the retracting vane "A" 64 which is urged back towards the power shaft 32 by the decreasing radius of the elliptical housing wall 14. The mixture 74 is compressed in the pressure chamber 84 within the vane guide 28 and in the related transfer port "A" 72. The pressurized mixture 74 is unable to exit the transfer port 72 due to the point of egress 73 thereof being closed off by the narrow radius portion of the elliptical housing wall 14.

Figure 11:
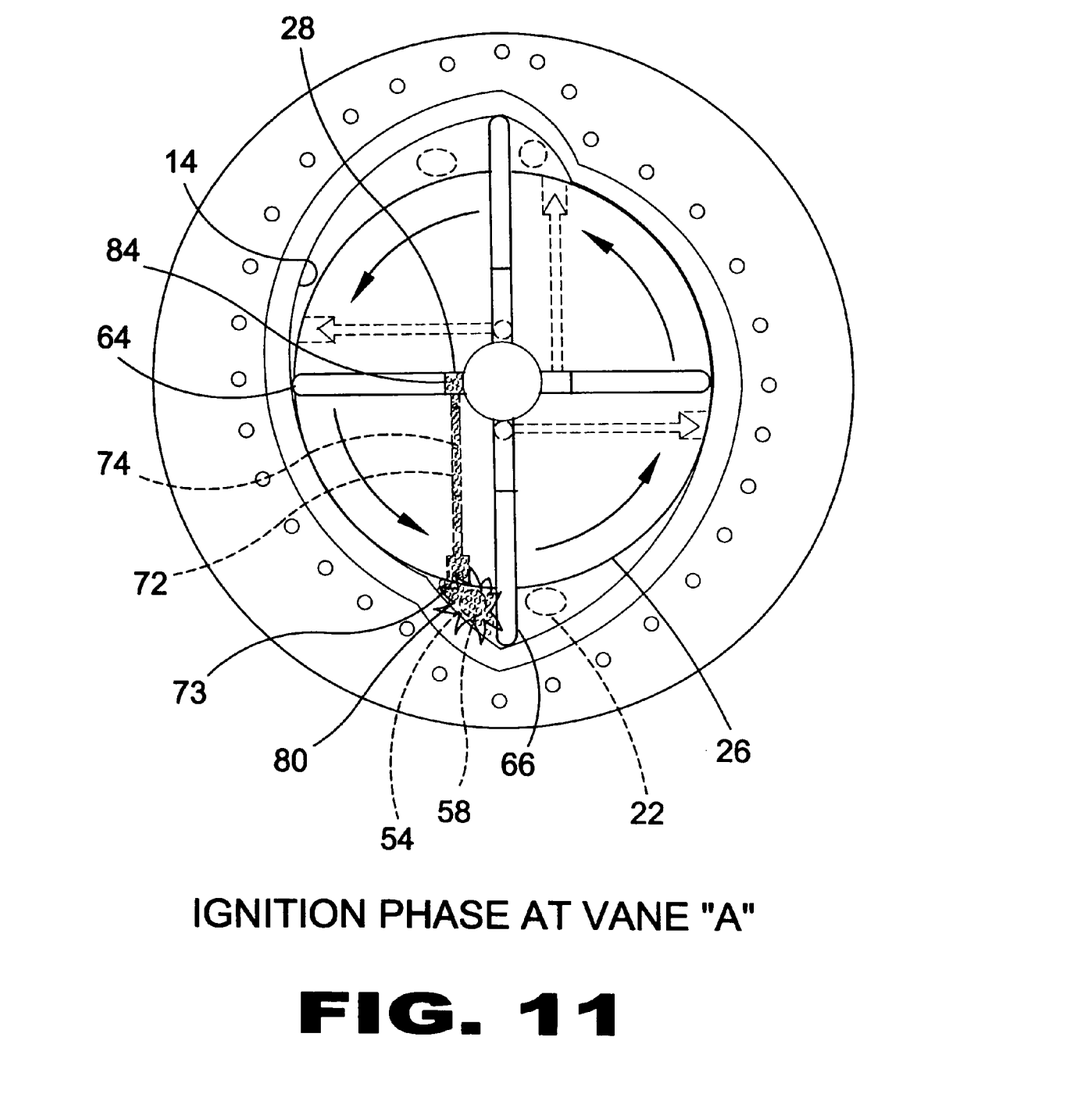
FIG. 11 is the ignition phase for vane "A".

FIG. 11 is the ignition phase for vane "A" 64. Vane "A" 64 is fully retracted into its vane guide 28 thereby achieving maximum compression of the now highly volatile fuel/oxygen mixture 74 within the pressure chamber 84 which is then released through the point of egress 73 of transfer port "A" 72 and expelled into the second combustion chamber 80 where it is ignited by the electrodes 58 of the ignition timing plug 54. The resultant combustion pressure acts upon the working surfaces of both the fixed elliptical wall 14 and vane "B" 66 thereby urging vane "B" 66 and the rotor 26 forward past the exhaust port 22 to expel the spent gases and start another cycle.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A single cycle elliptical rotary engine comprising:
   a) a housing assembly comprising:
      i) a rotor housing having a substantially hollow bisected, offset elliptical interior;
      ii) an end plate having a plurality of threaded bolt holes, a pair of ignition timing ports having marks of degree and a centrally disposed bearing boss; and
      iii) a ported end plate having a pair of opposing ignition timing ports, a pair of opposing exhaust ports, a pair of opposing fuel/oxygen intake ports and a centrally disposed power shaft throughbore leading to a bearing bore of a greater circumference; and
   b) a rotor assembly including a substantially cylindrical rotor having a power shaft extending from a central portion thereof;
   c) a plurality of vane guides radiating within said rotor from said power shaft every 90 degrees therefrom;
   d) at least one transfer port communicating perpendicularly between each said vane guide and the exterior sidewall of said rotor; and
   e) a vane disposed within each said vane guide with each said vane being of a length and width substantially similar to that of said vane guide and having a depth substantially shorter than that of said vane guide.

2. A single cycle elliptical rotary engine as recited in claim 1, wherein each said transfer port further includes a one-way check valve disposed proximal the exterior wall of said rotor permitting egress from said transfer port and restricting access therein.

3. A single cycle elliptical rotary engine as recited in claim 1, wherein said bisected, offset elliptical configuration of said rotor housing interior forms irregular curvatures at each end thereof defining a first combustion chamber and an opposing second combustion chamber.

4. A single cycle elliptical rotary engine as recited in claim 3, wherein said ignition timing ports are in communication with said combustion chambers.

5. A single cycle elliptical rotary engine as recited in claim 4, wherein said ignition timing ports have ignition timing plugs installed therein.

6. A single cycle elliptical rotary engine as recited in claim 5, wherein each said ignition timing plug comprises:
   a) electrodes in contact with said combustion chamber;
   b) an ignition wire plug disposed on the external portion of said ignition wire port for supplying power to said electrodes;
   c) a timing indicator mark disposed proximal to said ignition wire plug; and
   d) a plurality of seal grooves encompassing the circumference of said ignition timing plug.

7. A single cycle elliptical rotary engine as recited in claim 1, wherein said end plate, said rotor housing and said ported end plate each have a plurality of corresponding bolt holes for receiving bolts to secure the housing assembly into a solid unit containing said rotor assembly.

8. A single cycle elliptical rotary engine as recited in claim 1, wherein said interior elliptical wall of said rotor housing is proportioned with the narrowest diameter thereof substantially equivalent to that of said rotor while still allowing for the axial rotation of said rotor therein.

9. A single cycle elliptical rotary engine as recited in claim 8, wherein the greatest diameter of said interior elliptical wall extends from said first combustion chamber to said second combustion chamber and is of a distance sufficient to provide for the reciprocative radial extension of said vanes from said vane guides of said rotor while restricting their egress therefrom during operation.

10. A single cycle elliptical rotary engine as recited in claim 9, wherein the gap in each said vane guide between said vane and said power shaft defines a pressure chamber.

11. A single cycle elliptical rotary engine as recited in claim 10, wherein during the intake phase of operation a fuel/oxygen mixture is injected through said intake ports and pressurizes said opposing pressure chambers and their respective transfer ports thereby urging said vanes radially outwards against said interior elliptical wall as the radius thereof increases during the axial rotation of said rotor while the adjacent pair of said vanes remain fully retained within their respective vane guides by the narrow radius of said elliptical wall against which they are traveling.

12. A single cycle elliptical rotary engine as recited in claim 11, wherein the compression phase involves the decreasing radii of said elliptical wall urging said vanes back into said vane guides wherein the decreasing volume of said pressure chambers compresses said fuel/oxygen mixture which is restricted from exiting said transfer ports and said pressure chambers because the points of egress for said transfer ports are flush against said narrow portions of said elliptical wall thereby increasing the volatility of said fuel/oxygen mixture as said vanes further retract into said vane guides.

13. A single cycle elliptical rotary engine as recited in claim 12, wherein the ignition phase of operation involves said points of egress of said transfer ports reaching the rapidly increasing radii of their respective combustion chambers thereby expelling said volatile fuel/oxygen mixtures into said combustion chambers wherein said electrodes ignite said volatile mixture thus causing the rapidly expanding gases to provide a bias against the said vanes adjacent to and parallel with said transfer ports, said adjacent vanes being fully extended within said combustion chambers due to the fuel/oxygen mixtures introduced to their pressure chambers by said intake ports thus allowing the bias provided thereagainst to propel said vanes away from said expanding gases to rotate said rotor and associated power shaft thereby providing the expulsion of said spent gases through said exhaust port as the compression phase of the other pair of opposing vanes begins.

14. A single cycle elliptical rotary engine as recited in claim 13, wherein said spent gases are refused reentry into said transfer port by the one-way check valve disposed proximal said point of egress thereof.

* * * * *